United States Patent
Kobayashi et al.

(10) Patent No.: US 7,258,616 B2
(45) Date of Patent: Aug. 21, 2007

(54) FIXED TYPE CONSTANT VELOCITY UNIVERSAL JOINT

(75) Inventors: Masazumi Kobayashi, Shizuoka-ken (JP); Tohru Nakagawa, Shizuoka-ken (JP); Tomoshige Kobayashi, Shizuoka-ken (JP); Masamichi Nakamura, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 152 days.

(21) Appl. No.: 10/931,207

(22) Filed: Sep. 1, 2004

(65) Prior Publication Data

US 2005/0079918 A1     Apr. 14, 2005

(30) Foreign Application Priority Data

Sep. 4, 2003   (JP) ............................. 2003-313061

(51) Int. Cl.
    *F16D 3/224*   (2006.01)
(52) U.S. Cl. ...................... 464/145; 464/906
(58) Field of Classification Search ........ 464/144–146, 464/906; 29/898.065, 898.067
    See application file for complete search history.

(56) References Cited

U.S. PATENT DOCUMENTS 6,120,382 A    9/2000 Sone et al.

| | | | |
|---|---|---|---|
| 2002/0032064 A1 | 3/2002 | Sone et al. | 464/145 |
| 2003/0017877 A1* | 1/2003 | Kobayashi et al. | 464/145 |
| 2003/0054893 A1* | 3/2003 | Thomas | 464/145 |

* cited by examiner

Primary Examiner—Greg Binda
(74) Attorney, Agent, or Firm—Arent Fox LLP (57) ABSTRACT

A fixed type constant velocity universal joint having an outer joint member having eight arcuate guide grooves extending in the axial direction in an inner spherical surface, an inner joint member having eight arcuate guide grooves extending in the axial direction in an outer spherical surface. Eight balls are disposed between the guide grooves of the outer joint member and guide grooves of the inner joint member. A cage is interposed between the outer and inner joint members for retaining the balls. A center of the guide grooves of the outer joint member is offset from the center of the inner spherical surface, and the center of the guide grooves of the inner joint member is offset from the center of the outer spherical surface by an equal distance to opposite sides in the axial direction. A relation of $0.45 \leq B/A \leq 0.65$ is established, where A represents the wall thickness of the cage, and B represents the radial displacement of balls at a maximum joint angle.

6 Claims, 6 Drawing Sheets

FIXED TYPE CONSTANT VELOCITY UNIVERSAL JOINT

BACKGROUND OF THE INVENTION

1. Field of the Invention

The present invention relates to a constant velocity universal joint used in power transmission in automobiles and various industrial machines, and more particularly to a fixed type constant velocity universal joint having eight balls.

2. Prior Art

Figure 8A:
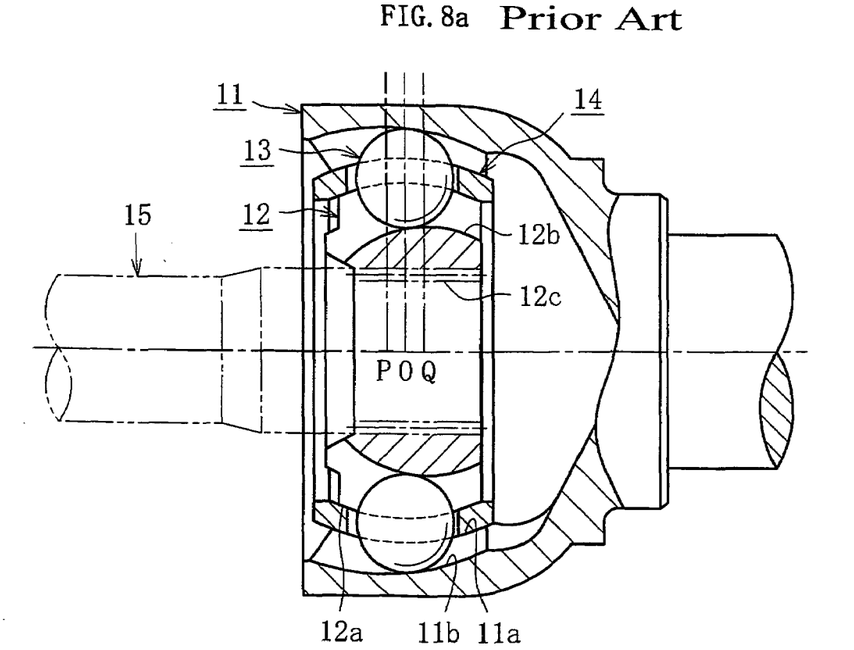
FIG. 8a is a longitudinal sectional view of a conventional fixed type constant velocity universal joint.
Figure 8B:
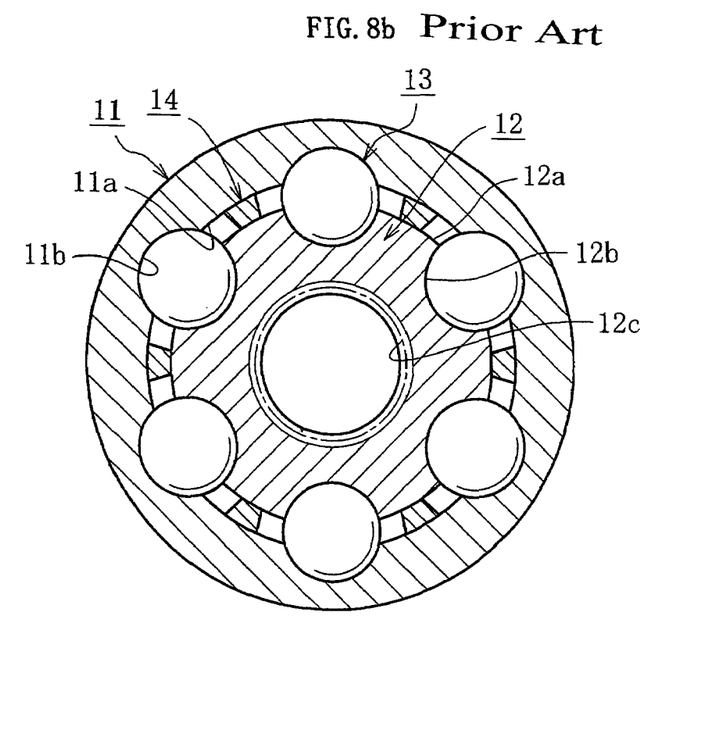

Constant velocity universal joints are classified into a fixed type not sliding in the axial direction, and a slidable type. FIGS. 8a and 8b show a Rzeppa type constant velocity universal joint (hereinafter called BJ type) as a representative example of a fixed type constant velocity universal joint. This constant velocity universal joint comprises an outer ring 11 as an outer joint member having six arcuate guide grooves 11b extending in the axial direction in an inner spherical surface 11a, an inner ring 12 as an inner joint member having six arcuate guide grooves 12b extending in the axial direction in an outer spherical surface 12a, six balls 13 disposed between the guide grooves 11b of the outer ring 11 and guide grooves 12b of the inner ring 12, and a cage 14 for retaining the balls 13.

Centers P and Q of the guide grooves 11b and 12b are offset from the joint center O by an equal distance (PO=PQ) to the right and left side in the axial direction. That is, the center P of guide groove 11b of the outer ring 11 is offset from center O of the inner spherical surface 11a to the opening side of the outer ring 11 by distance PO. The center Q of guide groove 12b of the inner ring 12 is offset from center O of the outer spherical surface 12a to the inner side of the outer ring 11 by distance QO. The centers of inner spherical surface 11a of the outer ring 11 and outer spherical surface 12a of the inner ring 12 coincide with the joint center O.

One (not shown) of two shafts to be coupled is connected to the outer ring 11, and other (shaft part 15) is connected to the inner ring 12. Accordingly, the inner ring 12 has a tooth profile, i.e. serration or spline, 12c to be coupled with the shaft part 15. The outer ring 11 and inner ring 12 form a certain angle, and the balls 13 guided in the cage 14 are maintained within a plane perpendicular to a bisector of angle θ formed by the outer and inner ring 11 and 12, so that the constant velocity of the joint is assured.

In a fixed type constant velocity universal joint, thus far, a constant velocity universal joint applicable to high angle (maximum joint angle 50°) was an undercut-free joint (called UJ type) comprising six balls 13, but by increasing the number of balls and reducing the ball diameter, a more compact UJ type having eight balls with same strength and durability has been developed (for example, see Japanese Patent Application laid-open under No. H9-317784).

SUMMARY OF THE INVENTION

Figure 1A:
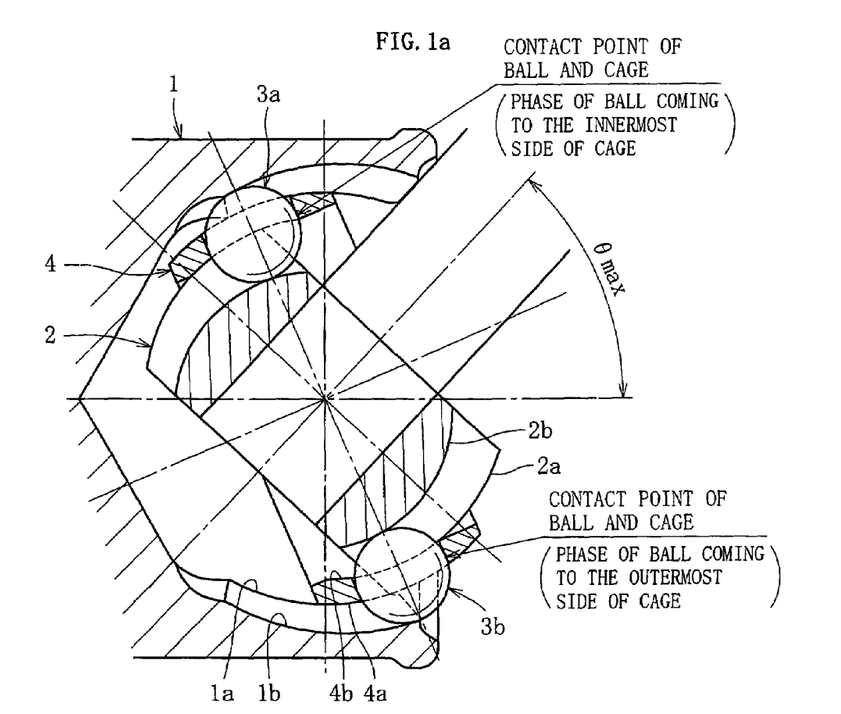
FIG. 1a is a longitudinal sectional view of a joint for explaining the structure of the invention.
Figure 1B:
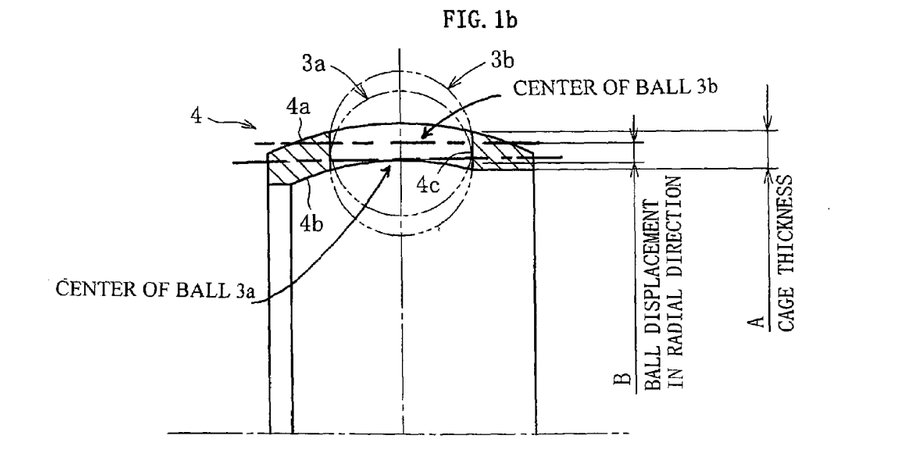
FIG. 1b is a sectional view of a cage.

In a fixed type constant velocity universal joint, when torque is transmitted in a state of forming a working angle, in the cage pockets, the balls move in the circumferential direction, and simultaneously move in the radial direction (see FIG. 1). In the conventional fixed type constant velocity universal joint with six balls, the wall thickness of the cage has been set at the minimum limit to satisfy the displacement of balls in the radial direction at the maximum joint angle, so that the ball contact point may settle within the cage pocket. This is because an increase of wall thickness of the cage causes the depth of guide grooves in the outer and inner rings to be reduced, thereby lowering the durability and life of the joint at a high angle and under a high load.

In the fixed type constant velocity universal joint having eight torque transmission balls, in order to realize a more compact design and lighter weight, it is important for the strength at the high joint angle be kept the same as that of the conventional constant velocity universal joint having six balls. To increase the strength of the cage, it is easy to increase the wall thickness of the cage, but by increasing the thickness of the cage, the depth of the guide grooves of the outer and inner rings becomes shallower. As the guide grooves of the outer and inner rings become shallower, contact ellipses of the balls can ride over the guide grooves at a high angle and high torque load. As a result, the durability and life of the joint are lowered.

Hence, it is an object of the invention to present a fixed type constant velocity universal joint with eight balls that is capable of satisfying two important functions: assurance of cage strength at high angle and assurance of durability and life at a high angle and under a high torque load.

It is other object of the invention to present a fixed type constant velocity universal joint with eight balls, the joint having an optimum cage thickness for: the appropriate cage strength at a high angle, the durability and life at a high angle, and a high load that is equivalent to that of the conventional fixed type constant velocity universal joint with six balls.

It is one aspect of the invention to present a fixed type constant velocity universal joint comprising an outer joint member having eight arcuate guide grooves extending in the axial direction in an inner spherical surface. An inner-joint member having eight arcuate guide grooves extending in the axial direction in an outer spherical surface. Eight balls are disposed between the guide grooves of the outer joint member and guide grooves of the inner joint member. A cage is interposed between the outer joint member and inner joint member for retaining the balls, in which the center of guide grooves of the outer joint member is offset from the center of inner spherical surface, and the center of guide grooves of the inner joint member is offset from the center of outer spherical surface by an equal distance to opposite sides in the axial direction. The relationship of $0.45 \leq B/A \leq 0.65$ is established, wherein A represents the wall thickness of the cage, and B represents the radial displacement of balls at maximum joint angle.

It is other aspect of the invention to present a fixed type constant velocity universal joint comprising an outer joint member having eight arcuate guide grooves extending in the axial direction in an inner spherical surface. An inner joint member has eight arcuate guide grooves extending in the axial direction in an outer spherical surface. Eight balls are disposed between the guide grooves of the outer joint member and the guide grooves of the inner joint member. A cage is interposed between the outer joint member and inner joint member for retaining the balls, in which the center of guide grooves of the outer joint member is offset from the center of inner spherical surface, and the center of guide grooves of the inner joint member from the center of outer spherical surface, by an equal distance to opposite sides in the axial direction. The inner spherical surface of the cage is offset from the outer spherical surface thereof to the opposite side by an equal distance in the axial direction. Further, straight portions having straight groove bottoms are provided in the guide grooves of the outer joint member and the inner joint member. A relationship of $0.65 \leq B/A \leq 0.85$ is established, wherein A represents the wall thickness of the cage, and B represents the radial displacement of balls at maximum joint angle.

The value R1 of ratio (F/PCR) of offset amount F to length PCR of a line segment linking the center of the guide grooves of the outer joint member or the center of the guide grooves of the inner joint member and the center of balls may be specified in a range of $0.069 \leq R1 \leq 0.121$.

A contact angle α of guide grooves and balls may preferably be in a range of 29° to 40°. When the offset amount F is decreased, the inversion start angle of a wedge angle between guide grooves of the outer joint member and the inner joint member becomes smaller. When the wedge angle is inverted, the play of the balls in the guide grooves is increased, and a hammering sound is generated. Accordingly, to set the wedge angle inversion start angle to be at least more than the ordinary angle of vehicle or the like, the contact angle α of the guide grooves and the balls is set in a range of 29° to 40°. Herein, the wedge angle refers to the angle formed by a common normal of a load side contact point of balls and guide grooves of the outer joint member, and a common normal of a load side contact point of balls and guide grooves of the inner joint member. The ordinary angle of the vehicle is generally 9° or less. As the joint angle increases, the wedge angle becomes negative reduced to below zero. This change of sign of the wedge angle, to below zero, is called an inversion of the wedge angle.

The following table shows the relationship of the value R1 of ratio (F/PCR) of offset amount F to the length PCR of the line segment linking the center of guide grooves of the outer joint member or the center of guide grooves of the inner joint member and the center of balls, the contact angle α, and the wedge angle inversion start angle.

TABLE 1

| Value of ratio F/PCR | Contact angle α (°) | Inversion start angle of wedge angle (°) |
|---|---|---|
| 0.069 | 45 | 8 |
|  | 40 | 9 |
|  | 29 | 14 |
| 0.121 | 45 | 14 |
|  | 40 | 16 |
|  | 29 | 25 |

As shown in Table 1, the smaller the contact angle α, the larger the wedge angle inversion start angle. Also, the larger the offset amount F, the larger the wedge angle inversion start angle. Therefore, as in the configuration described above, by setting the value R1 of ratio (F/PCR) of the offset amount F to the length PCR of the line segment linking the center of the guide grooves of the outer joint member or the center of the guide grooves of the inner joint member and the center of the balls in a range of $0.069 \leq R1 \leq 0.121$, and specifying the contact angle α of the guide grooves and the balls in a range of 29° to 40°, the contact ellipse of the balls will not be dislocated from the guide grooves to ride over the spherical surface. Further, at least at the joint angle smaller than the ordinary joint angle of the vehicle, play of the balls in the guide grooves is eliminated and generation of a hammering sound is prevented.

The fixed type constant velocity universal joint of the invention assures the specified thickness of the cage, and realizes a more lightweight and compact structure while having the durability and life and high angle strength equivalent to that of the conventional fixed type constant velocity universal joint with six balls.

Referring now to the drawings, preferred embodiments of the invention will be described.

BRIEF DESCRIPTION OF THE DRAWINGS

FIG. 2b is a cross-sectional view of the joint shown in FIG. 2a;

FIG. 3 is a partial, magnified view of FIG. 2a;

FIG. 8b is a cross-sectional view of the joint shown in FIG. 8a.

DESCRIPTION OF PREFERRED EMBODIMENTS

Figure 2A:
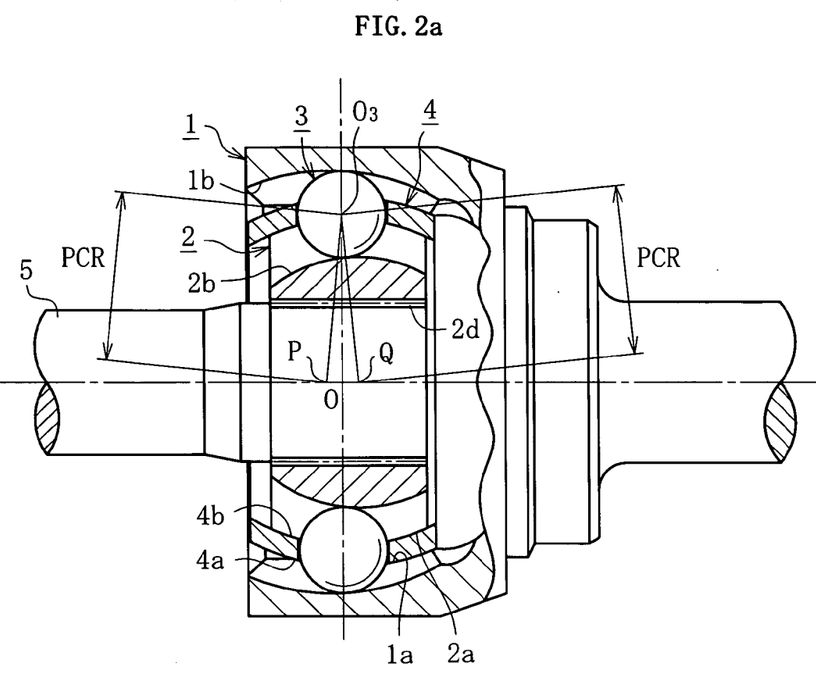
FIG. 2a is a longitudinal sectional view of joint according to an embodiment of the invention.
Figure 2B:
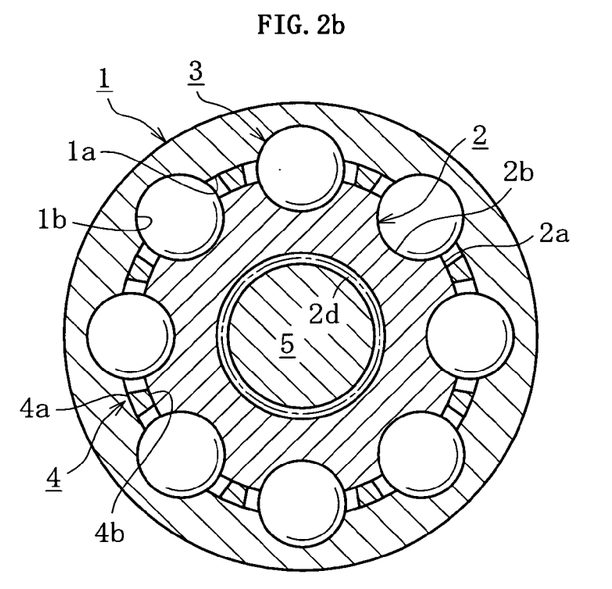
Figure 3:
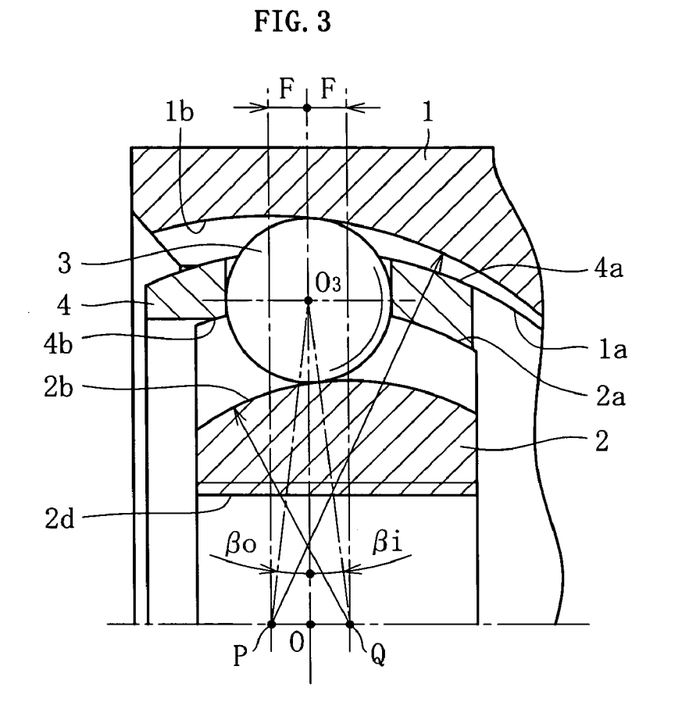

First, an embodiment of BJ type shown in FIGS. 2a, 2b and FIG. 3 is explained. FIG. 2a is a longitudinal sectional view of a joint, and FIG. 2b is a cross-sectional view of the joint. FIG. 3 is a partial, magnified view of FIG. 2a.

As shown in FIGS. 2a, 2b and 3, the fixed type constant velocity universal joint includes an outer ring 1, an inner ring 2, balls 3, and a cage 4. The outer ring 1, as the outer joint member, is formed like a cup, and a shaft part for connecting with one of two shafts to be coupled, is formed at the closed end side thereof. The outer ring 1 has a spherical inner circumference, that is, an inner spherical surface 1a. Eight arcuate guide grooves 1b extending in the axial direction are formed in the inner spherical surface 1a. The inner ring 2, as the inner joint member, has a tooth profile, i.e. serration or spline, 2d to be connected with other one (shaft part 5) of two shafts to be coupled. The inner ring 2 has a spherical outer circumference, that is, an outer spherical surface 2a. Eight arcuate guide grooves 2b extending in the axial direction are formed in the outer spherical surface 2a. The guide grooves 1b of the outer ring 1 and the guide grooves 2b of the inner ring 2 form pairs. One ball is disposed in a ball track formed by each pair of guide grooves 1b and 2b. A total of eight balls 3 are retained at equal intervals in the circumferential direction by the cage 4. The cage 4 has concentric outer and inner spherical surfaces 4a and 4b. The outer spherical surface 4a spherically contacts the inner spherical surface 1a of the outer ring 1, and the inner spherical surface 4b spherically contacts the outer spherical surface 2a of the inner ring 2.

In this embodiment, centers P and Q of the guide grooves 1b and 2b are respectively offset from joint center O by an equal distance (PO=QO=F) to the right and left side in the axial direction. That is, the center (outer ring track center) P of guide grooves 1b of the outer ring 1 is offset from the center O of the inner spherical surface 1a to the opening side of the outer ring 1 by a distance PO. The center (inner ring track center) Q of guide grooves 2b of the inner ring 2 is offset from the center O of the outer spherical surface 2a to the inner side of the outer ring 1 by a distance QO. the center of the outer spherical surface 4a of the cage 4, and the center of the inner spherical surface 1a of the outer ring 1 as the guide surface of the outer spherical surface 4a of the cage 4 both coincide with the joint center O. Similarly, the center of the inner spherical surface 4b of the cage 4, and the center of the outer spherical surface 2a of the inner ring 1 as the guide surface of the inner spherical surface 4b of the cage 4 both coincide with the joint center O. Therefore, the offset amount (PO=F) of the outer ring 1 is the axial distance between the center P of the guide grooves 1b and the joint center O, and the offset amount (QO=F) of the inner ring 2 is the axial distance between the center Q of the guide grooves 2b and the joint center O, and the both are equal to each other.

A length $PO_3$ of a line segment linking the center P of the guide grooves 1b of the outer ring 1 and the center $O_3$ of the ball 3, and the length $QO_3$ of the line segment linking the center Q of the guide groove 2b of the inner ring 2 and the center $O_3$ of the balls 3 are equal to each other, as indicated by PCR in FIG. 2a. Further, as shown in FIG. 3, an angle formed between the line segment linking the center P of the guide grooves 1b of the outer ring 1 and the center $O_3$ of ball 3, and the line segment linking joint center O and the center $O_3$ of balls 3 is called the outer ring track offset angle βo. An angle formed between the line segment linking the center Q of the guide grooves 2b of the inner ring 2 and the center $O_3$ of the ball 3, and the line segment linking joint center O and the center $O_3$ of balls 3 is called the inner ring track offset angle βi. The outer ring track offset angle βo and the inner ring track β1 are equal to each other.

In this configuration, one (not shown) of two shafts to be coupled and the outer ring 1 are connected, and the shaft part 5 and the inner ring 2 are connected. When the outer ring 1 and the inner ring 2 form a certain angle, the balls 3 guided in the cage 4 are maintained within a plane perpendicular to a bisector of angle θ formed by the outer and inner rings 1 and 2. Therefore, the distances $PO_3$ and $QO_3$ from the ball center $O_3$ to the guide groove centers P and Q are equal to each other ($PO_3=QO_3=PCR$), so that the constant velocity of the joint is assured.

As described above, the offset amount (F=PO=QO) of the guide grooves 1b and 2b is set in a range of value R1 of ratio F/PCR of $0.069 \leq R1 \leq 0.121$. In this embodiment, in order to assure the allowable load torque, the cage strength, the durability, and the working efficiency, it is preferred that the ratio be set at R1=0.104 (or 0.1038). In a comparative example (fixed type constant velocity universal joint with six balls as shown in FIG. 8), a general value of R1 is 0.14, and R1 of the embodiment is considerably smaller than that in the comparative example.

Figure 4:
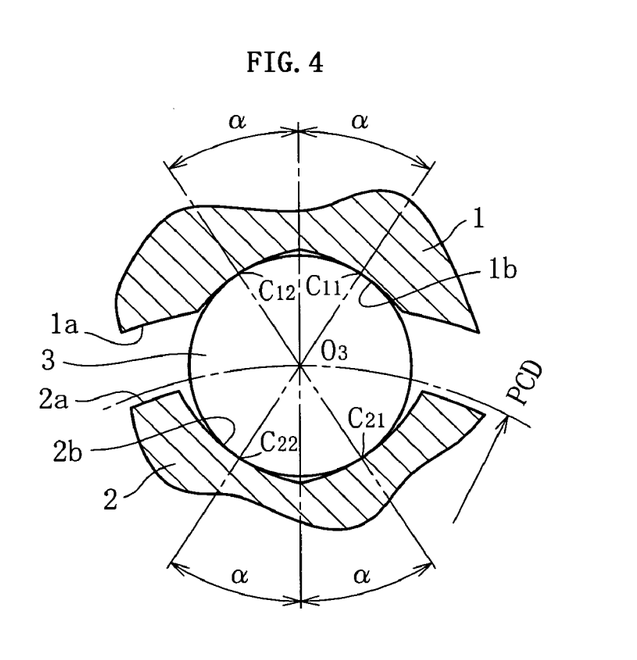
FIG. 4 is a partial, magnified view of FIG. 2b.

FIG. 4 is a partial, magnified view of FIG. 2b, showing a mutual relationship of the outer ring 1, the inner ring 2, and the balls 3. Guide grooves 1b formed in the inner spherical surface 1a of the outer ring 1 have a Gothic arch cross section. Guide grooves 2b formed in the outer spherical surface 2a of the inner ring 2 have also a Gothic arch cross section. Therefore, the balls 3 contact the guide grooves 1b of the outer ring 1 at two points $C_{11}$ and $C_{12}$, and contact guide grooves 2b of the inner ring 2 at two points $C_{21}$ and $C_{22}$. Angle α, formed by the center $O_3$ of the balls 3 corresponding to a line segment passing the center $O_3$ of balls 3 and joint center O and contact points $C_{11}$, $C_{12}$, $C_{21}$, $C_{22}$ with guide grooves 1b and 2b, is the contact angle. Contact angles α of contact points $C_{11}$, $C_{12}$, $C_{21}$, $C_{22}$ are all equal to each other, and set in a range of 29° to 40°. The contact angle α of 29° to 49° is smaller as compared with 37° to 45° in the conventional undercut-free joint with six balls, the fixed type joint with six balls or the fixed joint with eight balls. By setting the contact angle α at 29° or more, the contact surface pressure of the guide grooves and balls can be suppressed, and durability equivalent to that of the prior art can be obtained.

Figure 5:
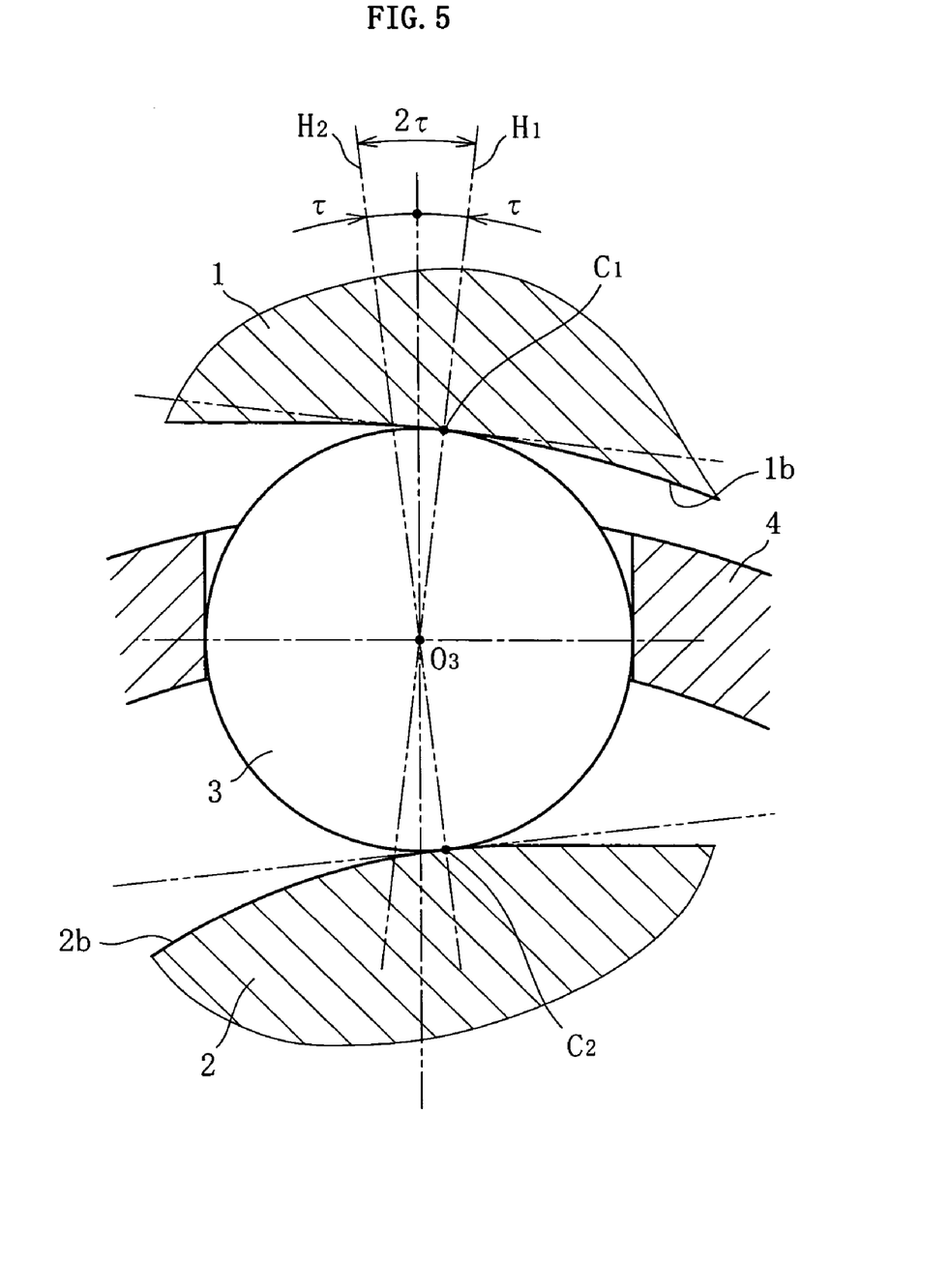
FIG. 5 is a partial, magnified view of FIG. 3.

FIG. 5 is a magnified view, in part, of FIG. 3 for explaining the inversion start angle of the wedge angle. As mentioned above, the angle formed by the common normal $H_1$ of the contact point $C_1$ of the balls 3 and the guide grooves 1b of the outer ring 1, and a common normal $H_2$ of contact point $C_2$ of balls 3 and guide grooves 2b of inner ring 2, is called the wedge angle 2τ. The common normal $H_1$ is a three-dimensional straight line linking the contact point of the outer ring 1 and the balls 3 and the ball center $O_3$. Similarly the common normal $H_2$ is a three-dimensional straight line linking the contact point of the inner ring 2 and the balls 3 and the ball center $O_3$. As shown in FIG. 5, contact point $C_1$ of the guide grooves 1b of the outer ring 1 and the balls 3 is inclined toward the joint center surface passing through the center $O_3$ of the balls 3 by an angle τ owing to the arcuate guide grooves 1b. Similarly, contact point $C_2$ of the guide grooves 2b of inner ring 2 and the balls 3 is inclined toward the joint center plane passing through center $O_3$ of balls 3 by angle τ owing to the arcuate guide grooves 2b. The wedge angle is equal to the sum 2τ of these wedge angles τ. The wedge angle 2τ decreases in a certain phase along with an increase in the joint angle, and is then inverted. The joint angle, upon start of the inversion of wedge angle 2τ, is set at 9° or higher.

Figure 6:
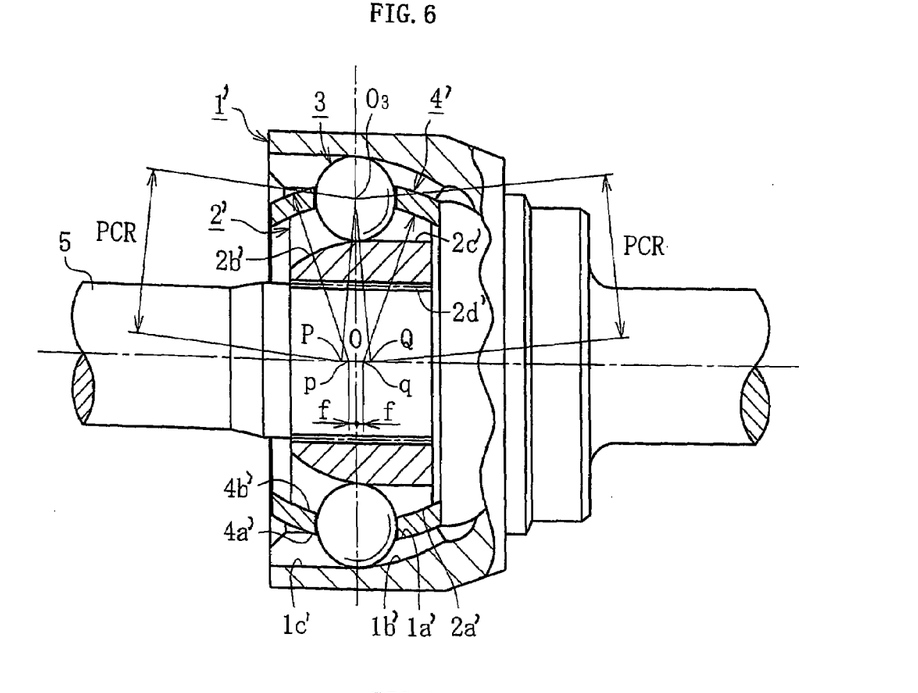
FIG. 6 is a longitudinal sectional view of a joint according to other embodiment.

FIG. 6 shows an embodiment of the UJ type. This embodiment is the same as the embodiment in FIG. 1 except that a straight portion 1c' is provided in the guide grooves 1b' of the outer ring 1c', a straight portion 1c' is provided in the guide grooves 2b' of the inner ring 2', and the spherical centers p and q of the outer spherical surface 4a' and inner spherical surface 4b' of the cage 4' are offset in the opposite directions by equal distance f in the axial direction.

Referring back to FIGS. 1a and 1b, in the fixed type constant velocity universal joint with eight balls, the cage strength at high angle and the durability and life at a high angle and a high load are compared with the conventional fixed type constant velocity universal joint with six balls, and the optimum value of the cage wall thickness for achieving the equivalent performance is explained. In FIG. 1a, the joint in FIG. 2a has the maximum joint angle θmax. The ball appearing in the uppermost part of FIG. 1a is indicated by reference numeral 3a, and the phase of this ball 3a is the phase of the ball coming to the innermost side of the cage. The ball appearing at the lowermost part of FIG. 1a is indicated by reference numeral 3b, and the phase of this ball 3b is the phase of the ball coming to the outermost side of the cage. FIG. 1b shows the balls 3a and 3b by a double dot chain line in the longitudinal sectional view of the cage 4, in which the distance between centers of ball 3a and ball 3b, indicated by character B, is the radial displacement of the ball in the pocket 4c of the cage 4. The wall thickness of the cage 4 is the radial dimension of the peripheral wall of the pocket 4c, and it is indicated by character A in FIG. 1b.

Supposing the wall thickness of the cage 4 to be A and the radial displacement of the ball 3 in one revolution of the joint to be B, the wall thickness A of the cage 4 is defined to satisfy the range of $0.45 \leq B/A \leq 0.65$ in the BJ type, and satisfy the range of $0.65 \leq B/A \leq 0.85$ in the UJ type. The optimum value range of wall thickness of cage differs between the BJ type and UJ type because, as already explained in relation to FIG. 6, the UJ type has straight portions 1c and 2c in the guide grooves 1b and 2b of the outer and inner rings, and the guide grooves are shallower at the joint inner side, as compared with the BJ type.

Figure 7:
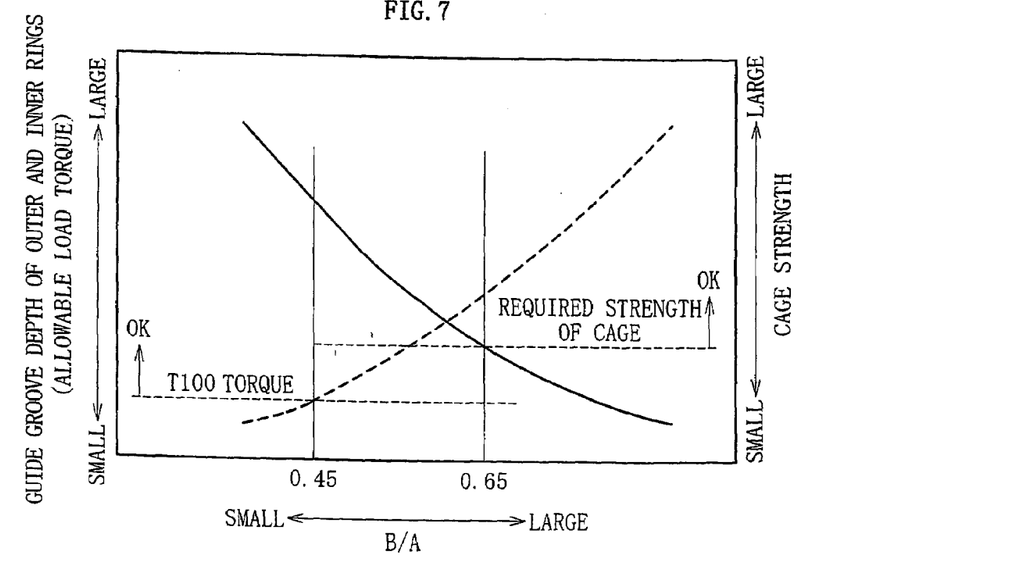
FIG. 7 is a diagram showing the relationship of cage strength and allowable load torque in terms of wall thickness of cage.

The meaning of this numerical value range is illustrated in FIG. 7. In FIG. 7, the numerical values refer to the BJ type, but a similar tendency is also noted in the UJ type. In the diagram, T100 torque is a basic torque used in the life calculation of a constant velocity universal joint, and is the torque value determined from the contact stress (Hertz stress) of the guide grooves and balls of the outer ring and inner ring. T100 torque means the torque capable of obtaining a life of 1500 hours at 100 rpm. As shown in FIG. 7, at B/A≦0.45, in other words, when the cage wall thickness A is larger more than necessary than the radial displacement B of the balls 3 in the pocket 4c of the cage 4, a sufficient strength of the cage 4 is assured; but the guide groove depth (inner side) of the inner and outer rings is too shallow. Thus, the contact ellipse of the balls 3 can move out of the guide grooves at a maximum joint angle, and the load torque is extremely lowered, and the joint function can be lost. On the other hand, at B/A>0.65, in other words, when the cage wall thickness A is not sufficient as compared with the radial displacement B of the balls 3 in the pocket 4c of the cage 4, the guide groove depth (inner side) of the inner and outer rings is sufficient, and the contact ellipse of the balls 3 will not move out of the guide grooves. To the contrary, the wall thickness A of the cage 4 is not enough, and the cage strength at a high angle cannot be assured. In the UJ type having eight balls, a similar tendency as in the BJ type is noted. Since the structure is thus different, the numerical value range is also different. Thus, in order to satisfy both the properties of cage strength at high angle and joint durability at high angle, an optimum wall thickness setting of the cage is required, with the range as specified above (0.45≦B/A≦0.65 in the BJ type, and 0.65≦B/A≦0.85 in the UJ type).

The invention claimed is:

1. A fixed type constant velocity universal joint comprising:
   an outer joint member having eight arcuate guide grooves extending in the axial direction in an inner spherical surface thereof,
   an inner joint member having eight arcuate guide grooves extending in the axial direction in an outer spherical surface thereof,
   eight balls disposed between the guide grooves of the outer joint member and guide grooves of the inner joint member, and
   a cage interposed between the outer joint member and inner joint member for retaining the balls,
   wherein the center of the guide grooves of the outer joint member is offset from the center of the inner spherical surface thereof, and the center of the guide grooves of the inner joint member is offset from the center of the outer spherical surface thereof by an equal distance (F) in opposite axial directions, and
   wherein the relationship of 0.45≦B/A≦0.65 is established, where A represents the wall thickness of the cage, and B represents the difference in radial displacement of balls at a maximum joint angle in the pocket of the cage.

2. The fixed type constant velocity universal joint of claim 1, wherein value R1 of ratio (F/PCR) of offset amount (F) to length (PCR) of line segment linking center of guide grooves of the outer joint member or center of guide grooves of the inner joint member and center of balls is specified in a range of 0.069≦R1≦0.121.

3. The fixed type constant velocity universal joint of claim 1, wherein a contact angle between the guide grooves and the balls is in a range of 29° to 40°.

4. A fixed type constant velocity universal joint comprising:
   an outer joint member having eight arcuate guide grooves extending in the axial direction in an inner spherical surface thereof,
   an inner joint member having eight arcuate guide grooves extending in the axial direction in an outer spherical surface thereof,
   eight balls disposed between the guide grooves of the outer joint member and guide grooves of the inner joint member, and
   a cage interposed between the outer joint member and inner joint member for retaining the balls,
   wherein the center of the guide grooves of the outer joint member is offset from the center of the inner spherical surface thereof, and the center of the guide grooves of the inner joint member is offset from the center of the outer spherical surface thereof by an equal distance (F) in opposite axial directions, and the inner spherical surface of the cage is offset from the outer spherical surface thereof to the opposite side by an equal distance (f) in the axial direction,
   wherein straight portions having straight groove bottoms are provided in the guide grooves of the outer joint member and the inner joint member, and
   wherein the relationship of 0.65≦B/A≦0.85 is established, where A represents the wall thickness of the cage, and B represents the difference in radial displacement of balls at a maximum joint angle in the pocket of the cage.

5. The fixed type constant velocity universal joint of claim 4, wherein value R1 of ratio (F/PCR) of offset amount (F) to length (PCR) of line segment linking center of guide grooves of the outer joint member or center of guide grooves of the inner joint member and center of balls is specified in a range of 0.069≦R1≦0.121.

6. The fixed type constant velocity universal joint of claim 4, wherein a contact angle between the guide grooves and the balls is in a range of 29° to 40°.

* * * * *